July 18, 1967
R. L. OLSON
3,331,610
PRESSURIZED SEAL STRUCTURE FOR CORE BOXES EMBODYING
CLOSED CELL ELASTOMERIC MATERIAL
Filed Jan. 18, 1965
2 Sheets-Sheet 1
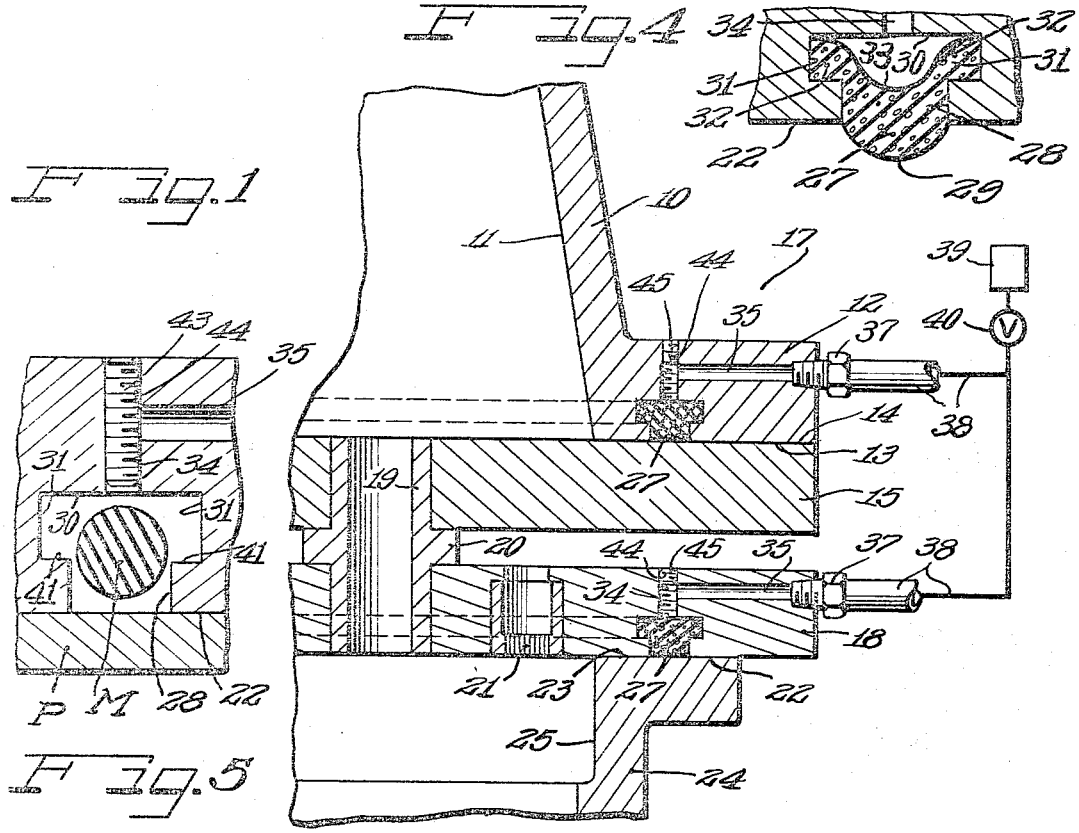
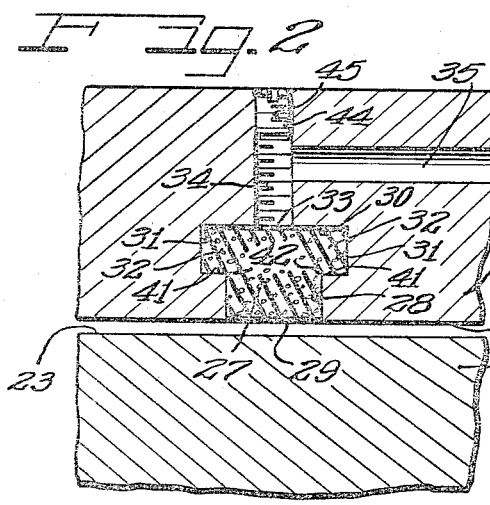
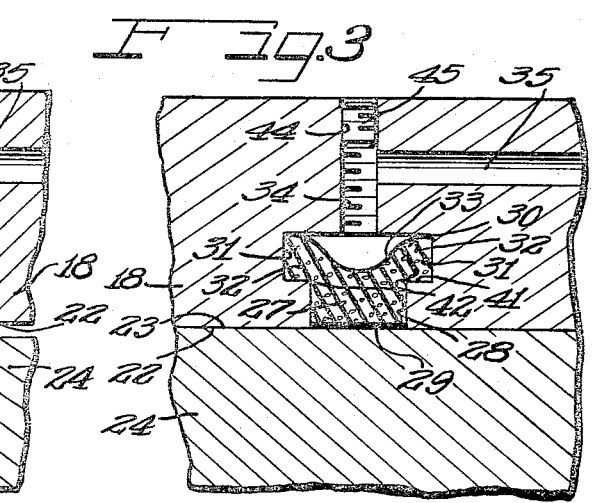
INVENTOR.
Richard L. Olson
BY
ATTORNEYS

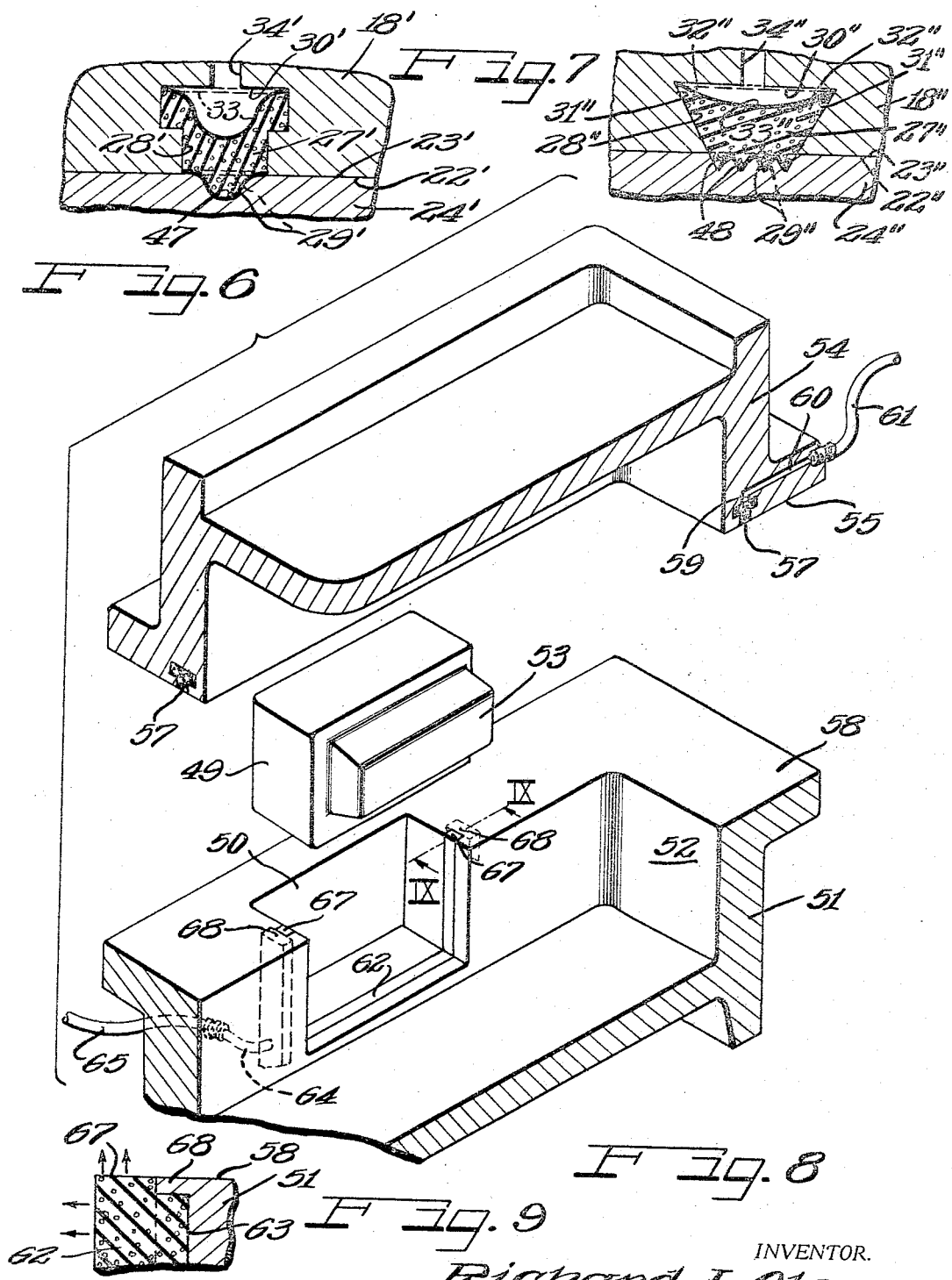

United States Patent Office 3,331,610
Patented July 18, 1967

3,331,610
PRESSURIZED SEAL STRUCTURE FOR CORE BOXES EMBODYING CLOSED CELL ELASTOMERIC MATERIAL
Richard L. Olson, Hickory Hills, Ill., assignor to Dike-O Seal, Incorporated, Chicago, Ill., a corporation of Illinois
Filed Jan. 18, 1965, Ser. No. 426,308
10 Claims. (Cl. 277—171)

This invention relates generally to pressure assemblies comprising a sealing strip of elastomeric material having compressible gas cells, and more particularly concerns the sealing of cavitated assemblies in which separable joints must be sealed against pressure differential leakage, such as core boxes, pressure molds, blow plates and mating flasks or molds, and other enclosures where an effective seal against internal or external pressure is needed temporarily.

A tongue and groove seal involving the use of compressible closed cell elastomeric material is provided according to my Patent 2,815,549 issued Dec. 10, 1957. This sealing arrangement has been found quite successful in practice, but does require that a matching groove be provided in one parting face to receive the tongue-like ridge of the sealing strip which is carried by and secured within a groove in the mating parting face.

Avoidance of the matching groove in one of the parting faces is the principal attribute of the invention as set forth in my Patent No. 3,166,332 dated Jan. 19, 1965, wherein the compressible elastomeric seal strip is carried within a groove in one of the parting faces and has a normally projecting rib which is compressed by the ungrooved opposing parting face into the body of the seal strip. Such construction has been found quite advantageous in practice and especially where it is undesirable, economically or physically, to provide the matching seal-rib-receiving groove in the opposing parting face, as where a plurality of successive members must be sealingly mated with the seal-carrying member.

In both of the mentioned patented arrangements, the seal-carrying member has the seal rib normally projecting from the parting face in which mounted. Under conditions of severe usage, such as where rigid members are relatively dragged across the parting face, damage is often caused by cutting or tearing out of portions of the projecting seal rib. Under conditions where during relative movement of the members the parting faces are required to be in extremely limited spaced relation, dragging of the projecting rib sometimes creates a problem. Extreme offset partings also present a problem, especially in respect to use of the compressible ridge or rib form of the seal due to drag in assembling and separating of the separable members. In addition, of course, in both prior forms of the seal, at least a master plate with a machined groove therein has been required for molding of the ridge rib or projection of the seal. In complicated contourings, especially, machining of the groove is difficult and expensive.

An important object of the present invention is to provide a new and improved seal especially suitable for temporarily sealing separable pressure assemblies in industrial processes, supplemental to the tongue and groove and compression seals of the aforementioned patents, and utilizing the advantageous elastomeric material have compressible gas cells but avoiding any projecting tongues or ribs or ridges in the non-sealing condition of the seal.

Another object of the invention is to provide a new and improved pressure assembly comprising a sealing strip of elastomeric material having compressible gas cells and which strip is normally within the plane of the parting face of the member carrying the strip.

A further object of the invention is to provide a new and improved compressible closed cell elastomeric material seal for pressure assemblies and constructed and arranges to be pressurized for sealing.

Other objects, features and advantages of the present invention will be readily apparent from the following detailed description of certain preferred embodiments thereof taken in conjunction with the accompanying drawings, in which:

FIGURE 1 is a fragmentary vertical sectional detail view through a portion of a core blowing machine magazine structure and an associated core box member and disclosing use of the present invention;

FIGURE 2 is a substantially enlarged fragmentary sectional detail view, taken in substantially the same plane as FIGURE 1 but showing only one of the sealing strips and the immediately adjacent components of the assembly, the parting faces of the components being separated;

FIGURE 3 is a sectional detail view similar to FIGURE 2 but showing the parting faces clamped together and the sealing strip in the pressurized sealing condition thereof;

FIGURE 4 is a sectional detail view similar to FIGURE 3, but showing by way of comparison how the sealing strip acts under pressurization but without an opposing parting face;

FIGURE 5 is a sectional detail view illustrative of certain features of the method of making the seal;

FIGURE 6 is a sectional detail view showing a modification;

FIGURE 7 is a sectional detail view showing a further modification;

FIGURE 8 is a fragmentary exploded sectional isometric view of a core box assembly including a removable insert piece; and FIGURE 9 is a fragmentary sectional detail view taken substantially on the line IX—IX of FIGURE 8.

Representative of an important industrial use of the seal of the present invention, a sand core blowing machine structure is depicted in FIGURE 1, comprising a magazine 10 having a sand hopper 11 within which is housed, in operation, a charge of core sand and suitable binder, such as is well known in the foundry art. About its lower end, the magazine 10 has a lateral attachment flange 12 providing a parting face 13 against which a parting face marginal surface area 14 of a blow plate member 15 is adapted to be drawn under compression by securing means such as bolts. In the assembly shown, the blow plate 15 serves as the bottom closure for the magazine 10, and carries a lower blow plate member 18 connected thereto by one or more blow bushings 19 having respective spacer flanges 20 between the plate members to maintain the same in spaced relation so as to afford air exhaust space or gap for screened vents 21 in the lower plate 18. Marginally the lower blow plate member 18 has a lower parting face 22 adapted to be engaged by a parting face 23 of a sand mold 24 such as a dump core box, blow-in drier, and the like.

Since the sand used for molding purposes is necessarily of fine mesh screen grade, and the air pressure used in blowing the sand from the reservoir chamber 11 is from forty to one hundred and forty pounds per square inch, depending upon practical requirements in any particular case, and may even exceed such pressure in special situations, blow-by through the parting faces is a hazard that must be guarded against in spite of any imperfections in the parting faces, slight warpages, and the like. Some sort of gasket or sealing means are customarily employed in an endeavor to prevent blow-by not only from the cavity defining the magazine chamber 11 but also from the cavity defined by a chamber 25 within the molding box member 24. Heretofore, seals for this purpose have comprised projecting ribs, ridges or tongues which, at least during separation of the parting faces project substantially beyond the parting face of the member carrying the seal. This has certain drawbacks as mentioned hereinbefore, such as liability to damage, dragging in respect to close clearances when moving one of the separable members relative to the other, and the requirement for a matching tongue or rib ridge receiving groove in the mating member in the case of a tongue and groove seal and in the molding plate member in the case of a compression seal. Where, in a core blowing operation for example, a plurality of identical core boxes is used in sequence with one blow plate, the tongue and groove type of seal, of course, requires that each of the core boxes have a tongue type of seal to fit a matching groove in the blow plate, or conversely, each of the core boxes must have a groove to mate with the tongue type of seal on the blow plate. With the compression type seal, the member of the compression assembly which mates with the seal-carrying member does not need a matching groove, but a molding or match plate having the groove must be provided for molding the projecting portion of the seal.

According to the present invention, a seal 27 is provided which is adapted to be molded directly in place in the parting face of one of the members of the pressure assembly and normally lies entirely within the plane of such parting face so that it affords no outward projection when dormant. In use, however, the seal 27 sealingly engages against an opposing parting face. As shown in FIGURE 1, one of the seals 27 is carried by one of the separable members at each of the separable joints. Since the blow plate 15 is interchangeable with other blow plates from time-to-time, the parting face 13 of the machine magazine flange 12, in this instance, has the seal 27. Desirably, the parting face 22 of the core-box-engageable and matching blow plate member 18 carries the seal. Since both of the seals 27 are substantially the same, a description of one will suffice for the other. On reference to FIGURES 1 and 2, the seal 27 is shown in the dormant, non-sealing condition, emphasized by the separation between the members 18 and 24 in FIGURE 2. In this condition, the seal 27 fills an elongated recess or groove 28 in the parting face 22 of ample width to expose a sealing face 29 of the seal in the plane of the parting face 22. Aligned with its root surface 30, the groove 28 has at each side an undercut 31 providing an interlock channel or recess within which a respective complementary interlock flange portion 32 of the seal is engaged. In effect, the groove and the seal are of complementary generally T-shape cross-section, with the root surface 30 substantially wider in area than and directly opposite to the groove mouth or opening.

Excellent results have been obtained by making the seal 27 from a compressible, multi-closed-cell elastomer possessing a high degree of resiliency. While cellular rubber as such may be used, different types of synthetic resinous materials that are capable of being molded and set to a resiliently flexible, compressible, cellular elastomer may be used. At its sides, the seal body is desirably bonded to the surfaces defining the groove 28 including the undercut recess portions 31. Opposing the entire area of the root surface 30 of the groove, the seal body is provided with an abuttingly confronting inner or back surface 33 which is free and unattached with respect to the groove root surface.

Although the compressible closed cell elastomeric material body of the seal 27 completely fills the groove 28, the bulk compressible nature (as distinguished from merely bulk deflectable nature of a solid, non-cellular elastomer) of the seal, enables the efficient introduction of pressure fluid between the groove root surface 30 and the opposing base surface 33 of the seal to pressurize the seal for sealing purposes. Even though the seal strip may be located entirely about a cavity area to be sealed, introduction of pressure fluid may be at one point along the back face 33. As shown, a pressure fluid port 34 opens through the root surface 30 and is in comunication through a passage 35 opening through an outer surface of the associated member 18 (or 12) and arranged to be connected as by means of a nipple 37 with a conduit 38 leading from a suitable pressure source 39 such as a compressor, compressed air storage tank, or the like, 39 and under the control of a valve 40 by which air, serving as the pressure fluid, can be introduced for pressurizing the seal and bled off to release or deactivate the seal. Although the pressurizing system has been shown in FIGURE 1 schematically as operable independently of any air pressure system and the control means therefor operable in relation to the core blowing functions related to the magazine 10, it will be readily apparent that an integrated, synchronized, timed, sequentially operable, or otherwise suitable cooperative relationship may be provided for. For operating convenience, for example, a pneumatic or electro-pneumatic arrangement may be provided wherein the operator is required to operate a single actuating device such as a switch, valve lever, or the like, to effect both pressurization of the seal or seals 27 and core blowing operation of the machine. Whatever the preferred arrangement, pressurization of the seals 27 is desirably effected to be effective before the effect of operating pressure is present in the joint of the cavitated assembly having the pressurized seal.

As a result of the compressible and elastic characteristics of the seal body 27 introduction of the pressure fluid through the port 34 into the opposed-face area of the unattached root surface 30 and the back face 33 of the seal, the back face 33 and the body of the seal act diaphragm-like to open a pressure fluid gap throughout the length of the seal strip. This action is so uniformly rapid throughout the length of the strip as to be, for all practical purposes, instantaneous, and even though the parting faces of the cavitated members are in abutment so that said sealing face 29 is held against any substantial displacement from the parting face of the member in which the seal is mounted.

As the seal back surface 33 cavitates under the fluid pressure applied thereto, sealing thrust is generated through the body of the seal 27 toward the sealing surface 29 whereby the latter sealingly thrusts against the opposing joint or parting surface 23 (or 14, as the case may be) as indicated in FIGURE 3. The magnitude of sealing thrust can be readily calculated or predetermined for the particular service requirements by the compression factor or compressibility of the material of the seal 27, the pressure exerted by the pressure fluid, and the area of the seal back face 33 relative to the sealing face 29. It will be apparent, also, that as the seal back face 33 cavitates away from the root face 30, the total surface area of the face 33 progressively increases by stretching of such face and thus the ratio of pressure area of the back face to the sealing face area progressively increases for sealing efficiency. This result is enhanced by having the total area of the seal back face 33 exposed to the pressure fluid initially substantially greater than the area of the sealing surface 29, as is effected by having the root of the seal-confining groove of greater width than the outer end of the groove confining the sides of the seal and determining the width of the sealing face 29.

Upon release of the pressurized fluid or bleed-off, the seal 27 instantly relaxes, expands with diaphragm pumping action to evacuate the pressure fluid between the seal back surface 33 and the root surface 30 and the sealing surface 29 remains in the plane of the parting face 22 when the opposing member 24 is separated.

If, for any reason, whether intentional or inadvertent, the pressurizing pressure fluid is not bled off when the opposed member is separated relative to the seal, or if the pressure fluid is admitted behind the seal in the absence of an opposing parting face contiguous to the parting face 22, the resilient flexibility inherent in the seal 27 permits the sealing surface 29 to be bulged outwardly as shown in FIGURE 4 due to the lack of confinement. However, blowing out of the seal is prevented because the sides of the seal are bonded to the opposing surfaces of the seal-confining groove 28. As a matter of fact, where it is desirable that the seal 27 positively confine all of the pressurizing pressure fluid, without leakage, diaphragm-like pressurizing or expanding of the seal as shown in FIGURE 4 may be deliberately effected for testing purposes.

Full bonding of the sides of the sealing strip 27 within the groove 28, especially adjacent to the sealing surface 29 is advantageous where fine particles such as sand are entrained in the pressure fluid to be confined within the cavitated assembly because the bonded relation avoids working in of particles of such material between the seal and the confining wall of the groove.

Although most generally it is desirable to have the seal 27 bonded at its sides in the groove 28, for some purposes this may not be necessary, and then the undercut groove portions 31 and the lateral flanges 32 of the seal therein will function advantageously to seal against leakage of pressure fluid from behind the seal during a sealing operation by what may be referred to as a "corking" or pressure sealing coaction between the respective seal flanges 32 and inwardly facing shoulders 41 opposing the flanges and toward which the flanges 32 are compressed during pressurization of the seal. More particularly, cavitation of the pressurized back portion of the seal toward the sealing face 29 will compress the material of the seal and more particularly of the flanges 32 into the groove undercuts 31 and especially the shoulder surfaces 41, and the salient angles 42 at juncture of the narrow portion of the groove 28 with the wider portion thereof.

Although if desirable or expedient, the seal 27 may be formed as a premolded or extruded strip and then installed in the groove 28 which has been suitably formed in the strip-carrying member, an eminently satisfactory method comprises in situ molding of the seal 27 in the groove. Such in situ molding of the seal may be accomplished in accordance with the teachings of my aforesaid patents with such modifications as necessary to attain the desirable results herein for maintaining the sealing face 29 within the plane of the associated parting face 22, the sides of the seal strip bonded to the opposing surfaces of the confining groove and the back face 33 of the seal substantially completely unbonded and free from the opposing root surface 30 of the groove. To this end, the groove 28 is completely preformed in any preferred manner as by properly coring it in a casting, or machining it as by means of suitable milling procedures. In such machining relatively rough machining will suffice since precision of the surfaces within the groove and even in respect to the exact location of the groove opening is not critical.

As a preliminary step in the molding process, the side wall surfaces defining the groove 28, including the surfaces 31 and 41 are treated with a suitable bonding agent. On the root surface 30 of the groove, a suitable parting agent is applied. Then uncured elastomeric material M (FIG. 5) is placed, as in the form of a convenient extruded rope or rod thereof into the groove 28 in a predetermined quantity per lineal extent of the groove. In closing relation to the groove 28 a molding plate P is placed. Such plate may be a separate molding plate or may be the member with which the parting face such as 22 will form a joint in use of the seal. The assembly is then ready for endothermic or exothermic curing, or even cold curing, as may be proper for the material M to release the blowing agent therein to produce the non-communicating, preferably small closed cell gas filled bubbles in the matrix of the cured elastomeric seal body. It will be understood that the opposing surface of the molding plate P will be treated with the parting agent. As a result, on completion of the curing the seal 27 will be bonded at its sides to the sides of the groove 28, but will remain free from the molding plate P at the seal surface and free from the root surface 30 of the groove.

As expansion of the seal-forming material M proceeds during curing within the closed chamber defined within the groove 28, air is pushed from the groove forwardly and escapes through the joint between the parting face 22 and the molding plate P. Air which might otherwise be trapped in the root area of the groove is evacuated through the port 34. Escape of the seal material through the evacuating port is prevented by plug means 43 conveniently comprising a screw which is loosely threadedly engaged in the port 34 through an extension bore 44 accessible from the outside of the seal-carrying member. Due to its high viscosity, the seal material will not escape through the loose threads, but air can readily escape under the pressure exerted by the expanding seal body. After molding of the seal has been completed, the plug 43 is removed, and a shorter closure plug 45 is sealingly engaged in the extension bore 44 and leaves the port 34 in free communication with the passage 35.

If for any reason it is necessary to provide for unusual surges or extremely high pressures which a flat engagement of the sealing surface of the seal may not adequately bar passage of pressure through a joint, at least within available or permissible fluid pressure loading or pressurization of the seal, it may be desirable to provide the parting face which opposes the seal with a groove into which the seal will displace sealingly when pressurized. In one desirable form, as shown in FIGURE 6, a groove, such as a generally V-shaped groove 47 is provided in the parting face 23' of the member 24' and in opposition to the seal-confining groove 28' but of a narrower width and substantially shallower than the groove 28'. Thus, when the members 18' and 24' are mated so that the parting faces 22' and 23' are in contiguity, the groove 47 will be in position to receive the sealing surface 29' of the seal strip 27'. Therefore, when the seal strip is pressurized through the port 24' to cavitate the pressure-receiving surface 23' of the seal away from the rib root surface 30 diaphragm-like, the seal body 27' in addition to being placed under compression is displaced in that portion opposite the groove 47 to project sealingly into the groove. Thereby, the sealing surface 29' makes sealing engagement with a substantially increased area of the member 24', and that portion of the seal which projects into the groove 47 provides a pressure-blocking barrier tongue across the parting face joint. This is an especially desirable arrangement where the parting face joint may present a slight gap or be warped or for some other reason close metal-to-metal contact is not feasible.

Another arrangement affording what in effect is a tongue and groove seal in the pressurized condition of the seal is shown in FIGURE 7. In this arrangement, the seal 27" normally fills a groove 28" of generally dovetail cross-section wherein the side walls of the groove, inclusive of the portions 31" at the widest root portions thereof are of generally straight, though not necessarily rectilinear, form from the outer to the inner edge to accommodate the wider inner flange portions 32" of the seal body. In the normal, relaxed condition of the seal 27" its back face 33" rests against the root surface 30", as shown in dash outline and the sealing face or surface 29" lies within the plane of the parting face 22".

If preferred, the parting face 23" of the mating member 24" of the assembly may be provided with a plurality of grooves 48 extending coextensive with and opposed in registering relation with the mouth of the seal groove 28". Thereby, when pressure fluid is introduced through the port 34" against the back 33" of the seal to thrust the seal outwardly, the back face 33" cavitates away from the root surface 30" and the sealing surface 29" of the seal thrusts into complementary mating ralation into the grooves 48 and provides a transverse series of pressure blocking tongues across the joint between the parting faces 22″ and 23″.

Through the embodiments of FIGURES 6 and 7, all of the advantages of the fully retracted seal structure are attained even though the respective seals 27′ or 27″ may have practically no gas bubbles or cells but comprise a low durometer elastomeric material. Since the sealing face portion of the seal strip displaces into the respective grooves registering therewith in the opposed parting face, sufficient diaphragm-like displacement of the body of the seal occurs under pressurization to afford ample pressure-receiving chamber area between the pressure-separable root surface of the groove and the opposing face surface of the seal strip. On the other hand, due to the inherent resilience and elasticity of the seal material, it springs back to the normal groove-filling, outwardly projection-free condition upon release from the biasing fluid pressure.

Substantial advantage is gained from applying the present invention in the design of cavitated assemblies such as core boxes requiring loose pieces such as will form necessary recesses in the surfaces of blown cores and which loose pieces must be ejected from the core box with the formed sand core before the pieces can be removed from the core. In the core box assembly, such loose pieces are desirably sealed to prevent sand from being blown between the pieces and the assembled container in order to avoid sticking and causing core damage during removal of the core from the core box. Seals with projecting tongues, ridges or ribs are, to be sure, a substantial improvement over unsealed loose pieces, but there is still the problem of friction of the elastomeric projections, the cutting of closely matching tongue-receiving grooves, and the like. The present invention affords all of the advantages of sealing the pieces against sand intrusion into the joints, without any of the disadvantages of projecting seals, since the seals are within the planes of the respective joint surfaces and therefore the loose pieces can be assembled and will eject as freely as if no sealing means were present.

In FIGURE 8 a representative core box assembly is depicted comprising a loose insert piece 49 which is matingly received in a complementary recess 50 in a core box bottom 51 having a core receiving cavity 52 into which a core shaping projection 53 of the loose piece 49 projects in the assembly. Cooperating with the bottom 51 is a core box top 54 having a parting face provided with a seal 57 embodying features of the present invention and affording a sealed joint with an opposing parting face 58 of the core box bottom 51. Pressurization of the seal 57 is through a port 59 through the root of the seal groove and communicating through a passage 60 with a suitable pressure fluid source to which connected by means such as a flexible hose conduit 61.

In the core blowing assembled relationship of the box members 51 and 54 and the loose piece 49, the top surface of the loose piece is flush with the parting face 58 and the seal strip 57 when pressurized seals against the opposed parting face of the loose piece as well as against the parting face 58.

For sealing the joint or parting face areas between the loose piece insert 49 and the opposing surfaces defining the insert recess 50, a seal strip 62 is provided in the core box bottom member 51 which, for this purpose, is provided with a suitable seal groove 63 (FIG 9). Similarly, as the seal 57, the seal 62 has the characteristics and function of the seal 27, being desirably made from a closed cell sponge elastomer. In the non-functioning condition thereof, the seal 62 has its sealing face within the planes of the respective surfaces which encompass the mating surfaces of the insert 49 and leading to the core box cavity 52. Sealing pressurization of the seal 62 is effected in the same manner as for the seal 27, namely, by introduction of pressure fluid such as compressed air behind the unattached groove root opposing back surface of the seal, as through a passage 64 communicating with a suitable pressure fluid source through a duct such as a flexible hose 65.

Opposite ends 67 are provided on the insert seal 62 sealingly engageable with the sealing face of the seal 57 in the assembly. Leakage of pressure fluid from behind the seal 62 past the ends 67 is prevented by an end wall 68 comprising part of the parting face 58 and partially closing off the opposite ends of the seal groove 63. At its ends, the seal strip 62 is bonded to the inner and end surfaces of the wall 68, and with the sealing end portions 67 of the seal extending into a flush relationship with the parting face 58 in the non-functioning unpressurized condition of the seal 62. When the assembly is complete, with the parting faces 55 and 58 adjoining and the seal 57 extending across the top of the insert piece 49 and the seal ends 67, pressurization of the seal 62 not only thrusts it sealingly against the opposing surfaces of the insert 49, but also thrusts the seal ends 67 toward the mating portion of the seal 57, as shown by directional arrows in FIGURE 9; and the seal 57, in turn, thrust under pressure against the seal ends 67 and thereby affords a thoroughly sealed relationship against the escape of air from within the cavity 52 past the insert piece 49. Yet, in the relaxed, non-functioning condition of the seal 62, the insert piece 49 is insertable and releasable with respect to the recess 50 as though no seal were present.

The disclosure of FIGURE 8 may also be considered representative of how the pressurized seal of the present invention is adaptable not only to the more moderate linear partings but also to virtually any parting contours that may be encountered including extreme parting joints and offsets wherever they may occur in a cavitated assembly, and such as are encountered with frequency in core box and other sand molding designs. The complete freedom from any projection of the seal beyond the surface within which contained permits entire freedom in assembly and separating sliding movements of the mating parting surfaces of the assembly. Yet, when the seal is pressurized, a thoroughly sealed joint is attained.

It will be understood that modifications and variations may be effected without departing from the scope of the novel concepts of the present invention.

I claim as my invention:

1. A pressure assembly comprising:
   a member having a cavity therein and a substantial insert-piece-receiving recess opening into said cavity,
   an insert piece member freely removably fitting into said recess,
   one of said members having a seal strip groove in its mating surface opposing the confronting mating surface of the other of said members,
   an elastomeric seal strip filling said groove and having a sealing face normally substantially flush with said mating surface of said one member whereby to avoid interference with free insertion and removal of said insert piece member,
   said groove having a root surface and said seal strip having an opposing back surface which are free from one another although normally in abutting confrontation,
   and means for introducing pressure fluid between said root and back surfaces to pressurize the seal strip to thrust said sealing face against the confronting mating surface.

2. A pressure assembly as defined in claim 1, wherein said cavitated member has a parting face adapted to receive a mating cavity-closing member and said recess also opening through said cavitated member parting face, said insert piece member having a parting face flush with said cavitated member parting face, said groove and said seal strip having ends in the plane of said cavitated member parting face and said flush parting face whereby on pressurization of the seal strip its ends will thrust toward said mating member.

3. A pressure assembly as defined in claim 2, wherein said ends of the groove have closure portions of said one member over a substantial area adjacent to said root surface and engaged by the ends of the sealing strip in order to prevent leakage of pressure fluid from the ends of the groove.

4. A pressure assembly comprising:
 a pair of separable substantially rigid members providing a parting joint about a cavity to be substantially sealed against a fluid pressure differential,
 one of said members having a substantial recess opening into the cavity and through the parting face of said one member,
 an insert piece freely mating in said recess,
 a seal groove in the mating surfaces of said recess and adjacent to but spaced from the cavity,
 the ends of said groove opening through the parting face of said one member,
 a strip of elastomeric material filling said groove and having a sealing surface normally flush with said mating surfaces of the recess and ends flush with said parting face of said one member,
 said groove having a root surface and the seal strip having a back surface free from but in normally confronting abutting relation to said root surface,
 passage means in said one member communicating with a source of fluid under pressure for selectively introducing pressure fluid between said root surface and said back surface to thrust the strip into sealing engagement with the confronting surfaces of the insert piece,
 the other of said members having in its parting face a seal groove aligned with the ends of said recess seal groove and the seal strip therein and running across said insert piece,
 and a seal strip in said other member groove for sealing said member parting faces and against which the ends of said recess seal strip sealingly thrust under sealing pressure.

5. A pressure assembly comprising:
 a pair of separable substantially rigid members with opposed parting faces providing a parting joint about a cavity to be substantially sealed against a fluid pressure differential,
 one of said members having in its parting face an elongated recess opening therefrom toward the opposed parting face,
 said recess having a root surface directly opposite the recess opening,
 a compressible, multi-closed-cell resiliently flexible strip of elastomeric material completely filling said recess and having an outer sealing face in the plane of the parting face of said one member,
 said strip being bonded at its sides to the sides defining said recess for holding the strip anchored in the recess and preventing fluid escape past said sides,
 said strip having an inner surface which is free and unattached abuttingly confronting the entire area of said root surface throughout its length,
 and means for introducing pressure fluid between said inner surface of the strip and said root surface and comprising a pressure fluid passage in said one member and adapted to be connected with a source of pressure fluid,
whereby upon introduction of the pressure fluid between the strip and said root surface the pressure fluid compresses said strip and compressibly displaces said inner surface into fluid distributing gap relation substantially instantaneously throughout the length of the strip and the body of the strip is placed under compression thrusting said sealing face under pressure toward and into sealing engagement with the parting face of the other of said members even though the parting faces are in abutment so that said sealing face is held against any substantial displacement from the parting face of said one member.

6. A pressure assembly as defined in claim 5, in which said inner surface of the strip cavitates away from said root surface under fluid pressure so that the total surface area of said inner surface is increased by stretching and the ratio of pressure area of the stretched inner surface to the sealing face area being thus progressively increased for sealing efficiency pressure of said sealing face against said parting face of the other of said members.

7. A pressure assembly as defined in claim 5, including a plurality of said seal-receiving grooves into which the sealing face portion of the strip is displaced under fluid pressure to provide a plurality of tongues across the parting joint.

8. A pressure assembly comprising:
 a rigid member having a parting face adapted to be placed in opposition to the parting face of a second member to provide a joint which must be sealed against a fluid pressure differential,
 said rigid member having in its parting face a seal groove opening therefrom and having sides and a root surface into which a pressure fluid port opens for communication with a pressure fluid source,
 a sealing strip of elastomeric material having substantially separate, independently acting, small, generally bubble-like gas cells having flexible interconnected walls of elastomeric material and completely filling said groove and having sides secured in fluid-tight relation to said groove sides and having a back face normally engaging said root surface in free unattached relation,
 said seal strip having a sealing face in the plane of said parting face of said rigid member,
 introduction of pressure fluid through said port effecting cavitation of said back face and compressing the body of the strip when said sealing face sealingly engages the parting face of a second member and is thus held against any substantial displacement from said plane.

9. A pressure assembly comprising:
 a pair of separable substantially rigid members with opposed parting faces providing a parting joint about a cavity to be substantially sealed against a fluid pressure differential,
 one of said members having in its parting face an elongated recess opening therefrom toward the opposed parting face,
 said recess having a root surface directly opposite the recess opening,
 a strip of elastomeric material filling said recess and having an outer sealing face in the plane of the parting face of said one member,
 said strip being secured in fluid-tight relation at its sides to the sides defining said recess and being free from said root surface,
 and means for introducing pressure fluid between said strip and said root surface and comprising a pressure fluid passage in said one member and adapted to be connected with a source of pressure fluid,
whereby upon introduction of pressure fluid between the strip and said root surface the strip is thrust under pressure sealingly toward and into engagement with the parting face of the other of said members, said parting face of the other of said members having a seal-opposing groove substantially shallower than said recess and opposing said sealing face of the strip so that when the strip is pressurized said sealing face displaces into said groove and forms a pressure-blocking tongue across the parting joint, the elastomeric material of said strip being of low durometer rating and substantially elastic so that the strip will readily displace elastically into said groove under pressurization and will snap back into non-functioning position in said plane when the fluid pressure is released.

10. A pressure assembly comprising:
a pair of separable substantially rigid members with opposed parting faces on an extreme contour,
one of said parting faces having therein a groove running entirely along said parting faces,
a seal strip of compressible, multi-closed-cell resiliently flexible, elastomeric material directly molded and completely filling said groove,
said strip being secured in bonded fluid-tight relation at its sides to the sides of said groove and having a sealing surface normally substantially flush with said one parting face and having a back face in normally separably abutting confrontation to the root of said groove,
and means comprising a passage communicating between said back face and said root for introduction of pressure fluid between said back face and said root to compressibly cavitate said back face away from said root and to thrust the body of the strip toward the opposing parting face to effect sealing engagement of said sealing surface therewith.

References Cited
UNITED STATES PATENTS

| | | | |
|---|---|---|---|
| 2,157,983 | 5/1939 | Glougie | 22—13 |
| 3,095,619 | 7/1963 | Peterson | 22—10 |
| 3,102,309 | 9/1963 | Peterson | 22—13 |
| 3,174,196 | 3/1965 | Hansberg | 22—36 X |
| 3,204,971 | 9/1965 | Meriano | 277—171 |

WILLIAM J. STEPHENSON, *Primary Examiner.*

E. MAR, *Assistant Examiner.*